J. T. AUSTIN.
KEY AND STOP ACTION FOR ORGANS.
APPLICATION FILED AUG. 3, 1911.

1,107,129.

Patented Aug. 11, 1914.
5 SHEETS—SHEET 1.

Witnesses:
S. S. Grotta
W. H. Linton

Inventor
John T. Austin
By W. H. Honiss Att'y.

J. T. AUSTIN.
KEY AND STOP ACTION FOR ORGANS.
APPLICATION FILED AUG. 3, 1911.

1,107,129.                         Patented Aug. 11, 1914.

Witnesses:
S. S. Grotta
W. H. Linton

Inventor:
John T. Austin
By W. H. Honiss Atty

J. T. AUSTIN.
KEY AND STOP ACTION FOR ORGANS.
APPLICATION FILED AUG. 3, 1911.

1,107,129.

Patented Aug. 11, 1914.
5 SHEETS—SHEET 5.

Witnesses:
S. S. Grotta.
Wm. A. Zeiser

Inventor:
John T. Austin
by W. A. Honiss
Atty.

UNITED STATES PATENT OFFICE.

JOHN T. AUSTIN, OF HARTFORD, CONNECTICUT, ASSIGNOR TO AUSTIN ORGAN COMPANY, OF HARTFORD, CONNECTICUT, A CORPORATION OF MAINE.

KEY AND STOP ACTION FOR ORGANS.

1,107,129.

Specification of Letters Patent.

Patented Aug. 11, 1914.

Application filed August 3, 1911. Serial No. 642,194.

*To all whom it may concern:*

Be it known that I, JOHN T. AUSTIN, a citizen of the United States, residing at Hartford, in the county of Hartford and State of Connecticut, have invented new and useful Improvements in Key and Stop Actions for Organs, of which the following is a specification.

This invention is an improved combined key and stop action for pipe organs and similar instruments.

An important object of the invention is to dispense with the plurality of valves for each pipe duct commonly used for such actions, whereby each pipe may be operated by means of a single valve, under the dual control of the key and stop connections, thereby avoiding complexity, expense, liability to leakage, and consequent imperfect operation.

This invention is herein shown to be embodied in and adapted to an organ of the general character shown in my prior U. S. Patent No. 537,664 of April 16, 1895, a characteristic feature of which is a wind chest having the various valve and pneumatic actions accessibly disposed upon its interior wall or ceiling, and utilizing the direct pressure of the air in that chest as motive power. These chests are generally made large enough to enable a man to stand upright therein, entrance and exit being had through an air lock, enabling the operator or adjuster to enter the wind chest while the air pressure is on, and to observe and adjust the actions while the organ is in full operation.

Figs. 7, 9 and 10 are end views partly in section.

Figure 1:
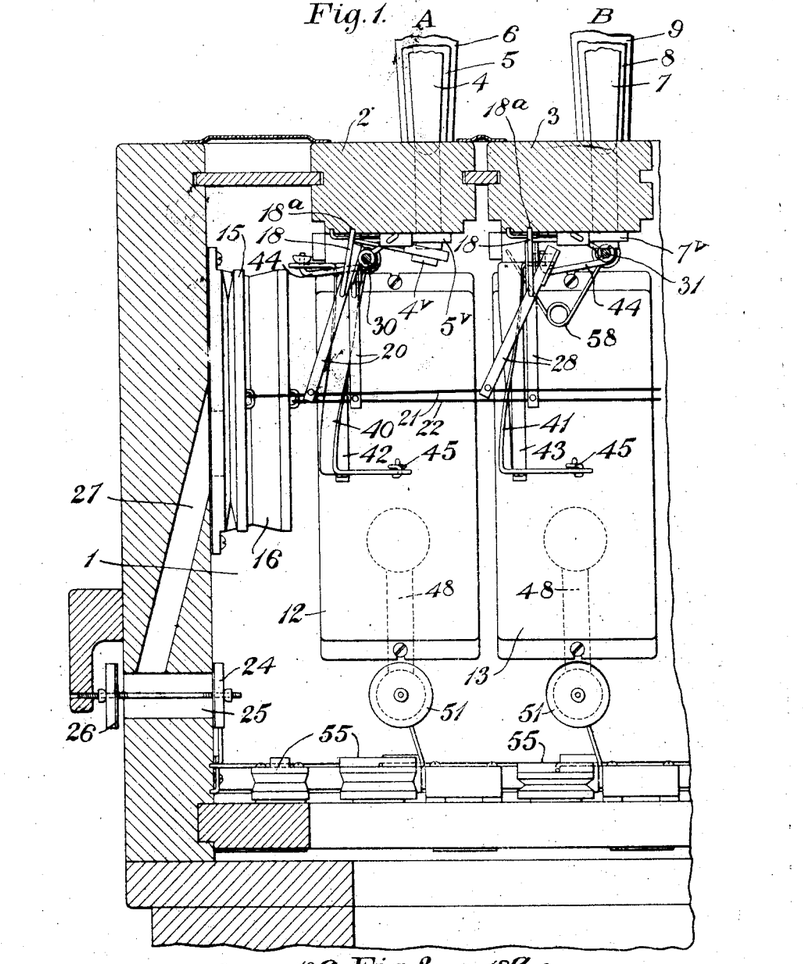
Figure 1 of the drawings is an end view of a portion of an organ, the walls of which are shown in section, and showing the stop and key devices for some of the pipes of two different registers or stops.
Figure 3:
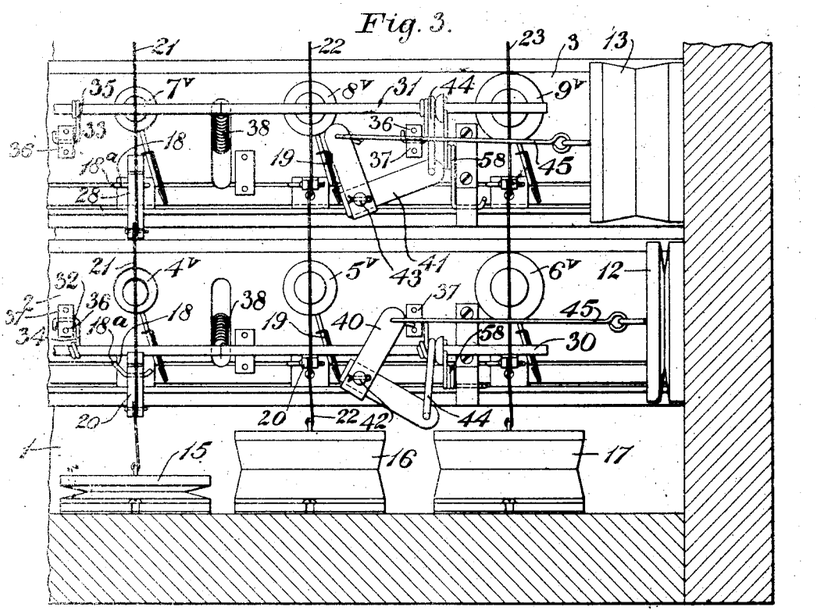
Fig. 3 is an underneath view, partly in section of what is shown in Fig. 1, showing the mechanism of one stop in its drawn or operative position, and showing the other stop mechanism in its inoperative and locked position.
Figure 4:
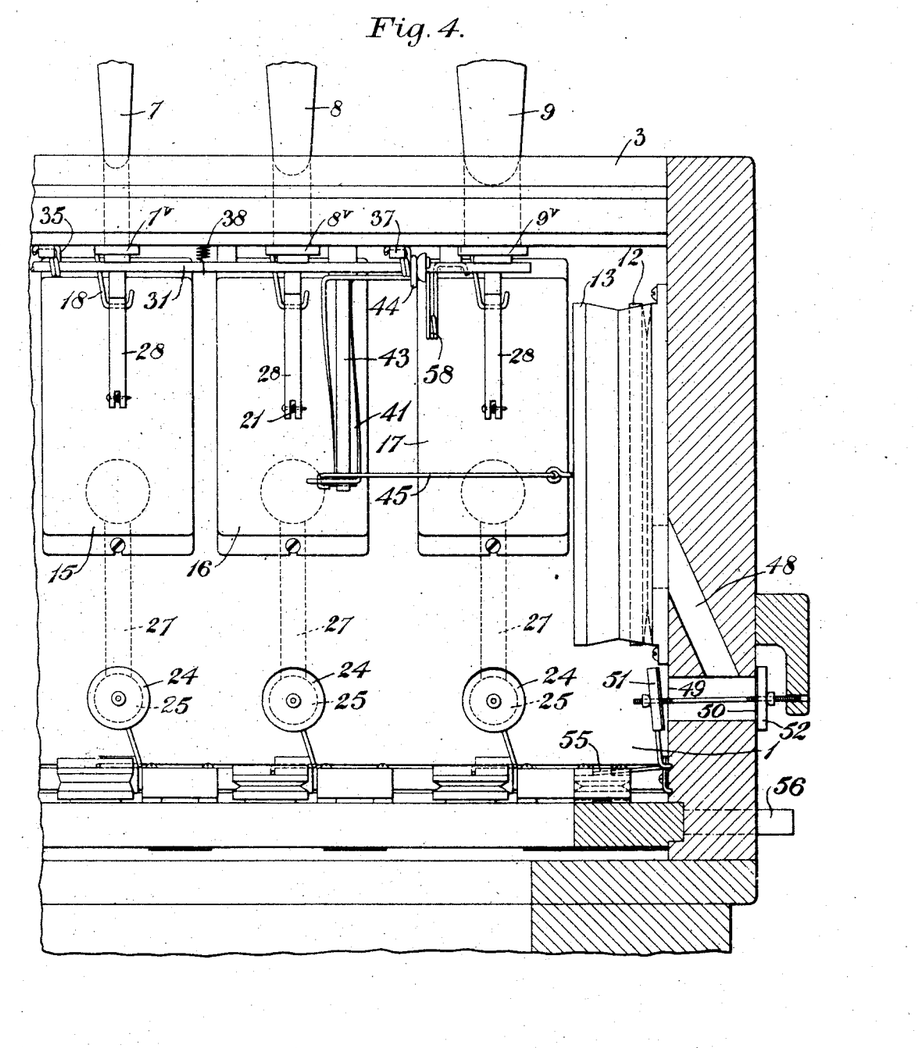
Fig. 4 is a side view also partly in section, projected from Figs. 1 and 3.

In the embodiment shown herein, portions of two stop and three key actions are illustrated. One stop A is represented by the register of pipes 4, 5 and 6, and the other stop B by the different register of pipes 7, 8 and 9 (Figs. 1 and 3), the mechanism or "actions" of these two stops being worked by the pneumatic or bellows motors 12 and 13, respectively. The three key actions illustrated are worked by the pneumatic or bellows motors 15, 16 and 17, respectively, (Figs. 1, 3 and 4). The pipes of these two stops are shown to be supported by bars 2 and 3, respectively, which form part of the upper wall of the ceiling of the wind chest. The arrangement and relative position of these stop and key actions in this embodiment of the invention are best illustrated in the underneath view shown in Fig. 3. The different stop actions extend in lines horizontally across that figure from the stop pneumatics 12 and 13, while the respective key actions, each connecting and operating a particular note in the different stops, extend from the key pneumatics 15, 16 and 17 in rows shown vertically through that figure, at right angles with the rows of stop actions. These pneumatics are or may be of the customary collapsing bellows form, and are herein shown to be disposed upon the side and end walls of the wind chest 1. The closing movements of these stop pneumatics draw on their associated stops, as indicated by the position of the pneumatic 12 and its connected fulcrum rod 30 of the stop A in Figs. 1 to 5 inclusive. When any stop pneumatic is expanded, like the pneumatic 13 in Fig. 3, the associated stop action, including the fulcrum rod 31 is in its off position illustrated by the fulcrum rod 31 of the stop B in Figs. 1, 2, 3 and 6.

Figure 2:
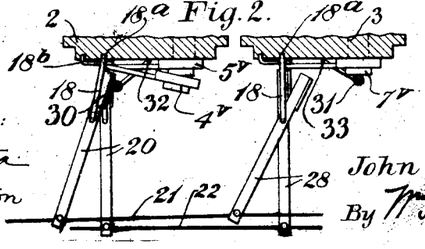
Fig. 2 is a fragmentary end view corresponding to a portion of Fig. 1, showing the valve devices in operative condition for one stop, and in inoperative and locked position for the other stop.
Figure 5:
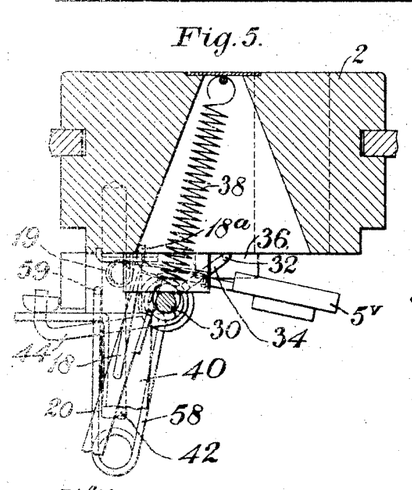
Figs. 5 and 6 are enlarged sectional end views, showing the stop and key actions in two different positions, Fig. 5 showing the actions in working condition with the stop drawn on, and Fig. 6 showing them in inoperative condition, with the stop drawn off and the valve locked down.
Figure 6:
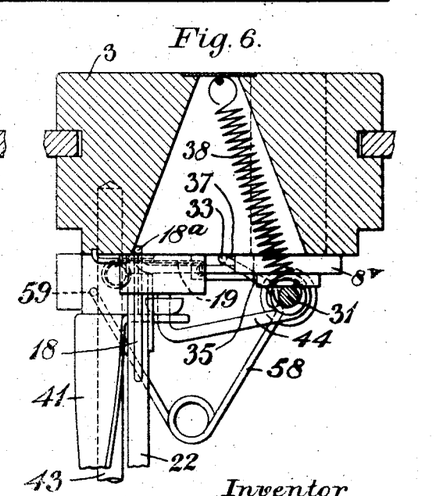

The key pneumatics 15, 16 and 17 operate through their traces or trackers 21, 22 and 23, respectively, to sound the corresponding notes in all of the stops which are drawn "on", leaving silent the corresponding notes of those stops which remain "off", as best illustrated in Figs. 2, 5 and 6.

The ducts leading through the ceiling of the wind chest to the respective pipes are opened and closed by means of a single valve for each pipe duct. These valves are operated under the dual control of the stop and key actions just referred to, the conjoint action of which is required to open the valves.

Each key action operates a set or series of levers appurtenant or adjacent to the respective pipe levers; and the action of these levers upon those valves is made dependent upon the position of a fulcrum abutment operated by the stop action, the levers becoming effective upon the respective valves when the corresponding fulcrum abutments are in their proper fulcrum position relative to the levers, as illustrated in Figs. 1 and 2, in which the stop A is shown to be "on" and the stop B "off", the valve levers 20 of the stop A being made effective upon their valves by the position of the fulcrum abutment 30, while the valve levers 28 of the stop B swing idly, due to the absence from its fulcrum position of the fulcrum abutment 31. Following this preliminary explanation of the general arrangement, a detailed description of the mechanism herein shown will now be given.

The valves for the pipes 4, 5 and 6 of the stop A are designated 4ᵛ, 5ᵛ, 6ᵛ, while the valves for the pipes 7, 8 and 9 of the stop B are designated 7ᵛ, 8ᵛ and 9ᵛ, respectively. These valves are herein shown to be pivotally mounted for swinging movement on the bars 2 and 3, adjacent to the respective pipe ducts, which are to be closed by the pallets of the respective valves. The body or frame portion of the valves, carrying these pallets, is herein shown to be made of an integral piece of wire having an operating arm 18, and a pivot or journal portion 18ᵃ, which is seated in grooves or sawkerfs 14 extending lengthwise through the bars 2 and 3, being held therein by means of clips 18ᵇ. These valves form the subject of another pending aplication, Serial No. 642,196, filed August 3, 1911. Upon the lower ends of the arms 18 of these valves are pivotally suspended the valve levers 20 and 28, to the lower ends of which are connected the traces 21, 22 and 23. Each trace represents a single note, and connects for swinging movement all the valve levers for sounding that note in the different stops. Each trace is operated directly or indirectly by the key, or perforation in a note sheet, or other device that may be used for controlling the sounding of that particular note. In the present embodiment the three traces shown are directly connected to key pneumatics 15, 16 and 17, respectively, which in turn are shown in Fig. 1 to be operated by primary pneumatics which receive their initial impulses from the keyboard of an organ console or a perforated note sheet, as the case may be. Thus each key pneumatic when closed and opened serves by means of its trace to swing the lever arms 20 and 28 back and forth, as indicated by the two positions of those arms shown in the drawings. The valves are provided with suitable means, as the springs 19, for yieldingly holding them in their closed positions with their pallets closing their respective pipe ducts as illustrated by the valve 8ᵛ in Fig. 6. The key pneumatics 15, 16 and 17, or their traces are provided with suitable weights or springs for yieldingly holding those pneumatics in their resting position, which may be opened or closed according to the character of the pneumatic system employed. In the present instance, being arranged to be closed by external pressure from the wind chest in which they are placed, these key pneumatics are at rest in their open position, as illustrated by the pneumatics 16 and 17 in Fig. 3. In the relay arrangement herein shown, the pressing of a key or the passage of a note perforation across a tracker duct operates as illustrated in Fig. 1 to close the pallet 24 and open the pallet 26, thus shutting off the wind chest pressure through the passages 25 and 27 to the pneumatic bellows 15, and opening those passages to the atmosphere, which allows the pneumatic 15 to be collapsed by the wind chest pressure, thereby swinging its associated valve levers 20 and 28 connected by the trace 21 to the position occupied by them in Figs. 1 and 2. Upon releasing the key, or closing the tracker duct, the pallet 26 closes, the pallet 24 opens, and the wind chest pressure enters the pneumatic 15 through passages 25 and 27, thus balancing the pressure in the pneumatic and enabling its spring or weight to expand it to its open position, thereby swinging its connected valve levers 20 and 28 to the resting position occupied by the two valve levers which are connected to the trace 22 in Figs. 1 and 2. Thus the opening and closing movement of each key pneumatic swings all of its connected valve levers 20 and 28, etc. of all the stops employed, regardless of whether those stops are on or off. The valve levers for those stops which are off swing idly without lifting their connected valves, while the valve levers of the stops which are on open their respective valves as illustrated by the action shown in Figs. 1 and 2 of the two valve levers 20 and 28 connected with the trace 21.

The swinging arms 20 and 28 are put into and out of operative connection with their respective valves by means of the stop mechanism, which will next be described. The operation of drawing on a stop establishes operative connection between all the pipe valves of that stop and their respective lever arms, so that any note is sounded in all stops drawn on whenever the key pneumatic corresponding to that note is operated. The drawing off of any stop breaks or disestablishes this operative connection between all the pipe valves of that stop and their respective lever arms, leaving the latter free to swing idly upon their pivots whenever operated by the key pneumatic, without opening their respective valves.

Each stop is provided with a movable abutment, herein termed a fulcrum rod, which, when the stop is drawn on, is moved into fulcrum relation to all the lever-arms associated with that stop, whereby the free swinging movement of the lever arms, imparted by their respective key pneumatics, is converted or translated into movement of the corresponding valves, opening them and allowing the corresponding pipes to be sounded by the outflow of air from the wind chest, through the pipe ducts. The abutments 30 and 31 shown herein consist of rods extending lengthwise of the series of pipes, comprising the respective stops. These fulcrum rods are mounted for swinging movement from the "on" position occupied by the rod 30 to the "off" position occupied by the rod 31 in Figs. 1, 2, 3, 5 and 6, serving also in this latter position the additional function of holding or locking the valve 7' and also similar valves of the same stop or register upon their respective ducts, to keep them tightly closed. Thus each of the rods 30 and 31 performs the combined functions of a fulcrum and a locking abutment. The center of swinging movement of these fulcrum rods may be disposed at any point which may be convenient for enabling the abutments to swing to the two positions indicated. In the form shown in Figs 1 to 7 inclusive the centers are at 32 and 33, respectively. Radius links 34 and 35 are disposed at convenient intervals along the length of the fulcrum rods 30 and 31, and are shown to be formed of wires having one end coiled around the rods, while the other or pivot end is mounted for swinging movement in the blocks 36 and 37. The rods are yieldingly held in their two positions by means of springs 38, attached as shown in Figs. 5 and 6 so as to draw the abutments toward their terminal positions, the springs passing from one side to the other of the centers of suspension 32 and 33 of the links 34 and 35. The fulcrum rods are moved from their "off" to their "on" positions by means of stop pneumatics 12 and 13, which are herein shown to be located on an end wall of the wind chest, and operating at substantially right angles with the swinging movements of their fulcrum rods, and in order to transmit this right-angled movement the cranked levers 40 and 41 are provided. These are mounted for turning movement upon vertical posts 42 and 43, secured to the pipe bars 2 and 3. The abutments 30 and 31 are connected with one arm of their respective crank levers by the connecting rods 44, the other arm of each lever being provided with a connecting rod 45 attached to the respective stop pneumatics 12 and 13 already referred to. These pneumatics and their relay systems are attached to the interior wall of the wind chest, and are provided with connecting air passages 48 provided with ports 49 and 50 leading to the wind chest and to the atmosphere, respectively. These ports are controlled by means of the valves 51 and 52, connected with a primary pneumatic 55, which in turn is connected with an air duct 56, the opposite end of which may lead to a tracker bar controlled by perforated music sheets, or, these ducts may be controlled by means of a manually operated valve connected with customary stop knobs or tablets located in the organ console.

When at rest in the position shown in Fig. 4 with the port 50 closed and the port 49 open to the interior of the wind chest, the pressure from the latter enters the pneumatic 13 through its air passage 48, balancing the pressure inside and outside of the pneumatic, leaving it free to be expanded by means of suitable springs attached in any convenient way, tending to open the pneumatic and carrying the fulcrum rods 30 and 31 from the "on" position shown in Fig. 5 to the "off" position shown in Fig. 6. As illustrated herein, the springs 58 employed for this purpose are of "grasshopper" form, one end encircling the abutments 30 and 31, while the other end is pivotally held at 59, in any convenient block or other appurtenance of the pipe bars 2 and 3.

When any stop is to be drawn on, the corresponding primary pneumatic 55 is operated to close the port 49 and open the port 50, thus collapsing the associated stop pneumatic 12 or 13, to the position of the pneumatic 12, and operating, through the connections described, to move the corresponding fulcrum rod for that stop from the position of Fig. 6 to that of Fig. 5, in which position the rod furnishes a fulcrum for the valve levers of that stop, and thereby establishes operative connection between them and their valves 4ᵛ, 5ᵛ, and 6ᵛ, so that any of those lever-arms when operated by its key pneumatic will open the corresponding valve and sound the note desired. Thus any note, as for example the note C, will be sounded in each one of the registers or "stops" which is in its "on" position shown by the stop A, but will be silent in all those stops which are in the "off" position shown by the stop B.

Figure 7:
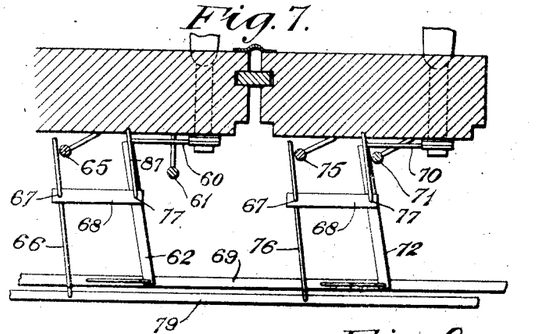
Figure 8:
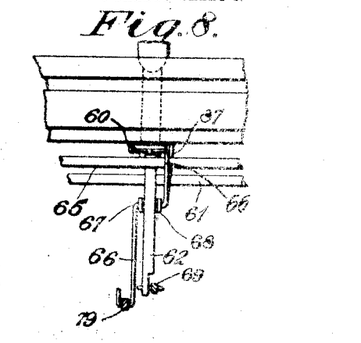
Fig. 8 is a side view projected from Fig. 7, illustrating the construction and operation of a further development of the invention, whereby the same stops may be operated independently from a plurality of different keyboards.
Figure 9:
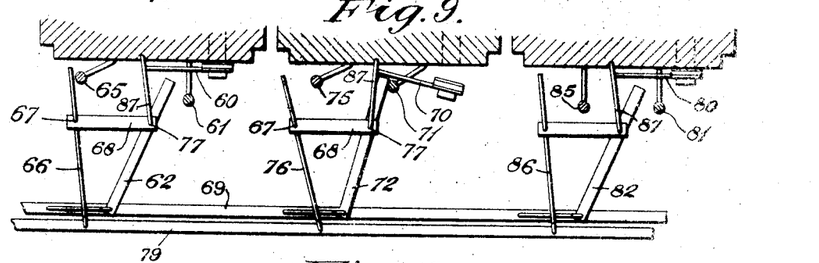
Figure 10:
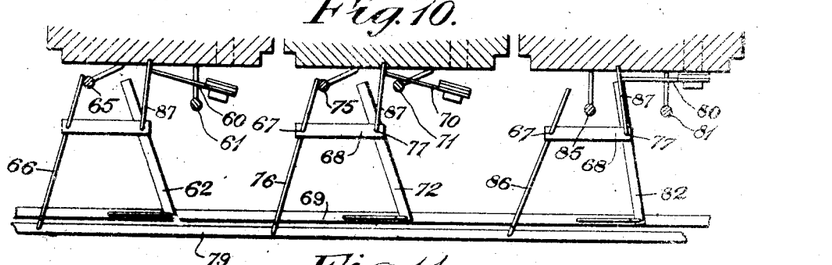

Figs. 7 to 10 inclusive illustrate a development or extension of this invention, which enables any desired number of the stop and key actions to be selectively and independently operated from a plurality of different operating points, as for example, from different keyboards of the organ console, by means of multiple connections to each of the pipe duct valves 60, 70 and 80. In this arrangement the main fulcrum rods 61, 71, 81 and their respective valve levers 62, 72 and 82, and their connecting key trace 69 are constructed, arranged and operated like the corresponding parts shown in Figs. 1 to 6 inclusive, and are operated by any of the means previously indicated herein, from the desired location, for instance the "great organ" keyboard. That portion of this compound or multiple action which enables the same valves 60, 70 and 80 to be also actuated independently from a different location by the key trace 79 and its connections, is shown herein to consist of the auxiliary fulcrum rods 65, 75, 85, respectively. These rods are operated in any of the ways previously indicated herein, from the desired location, for instance, by stop knobs or tablets on the "swell organ" keyboard. The corresponding key action, constructed and operated in any of the ways herein previously indicated, acts through the trace 79, and the valve levers 66, 76, 86. These valve levers are herein shown to be made of wire, pivotally attached at 67 to the connecting rods 68, the opposite ends of which are pivotally attached to the valves 60, 70, 80, preferably at the same pivotal points 77 at which the valve levers 66, 76, 86, are connected to those valves. The lower ends of the valve arms 87 are bent at 77 as shown in the figures to form a single pivot journal for their respective valves 60, 70, 80, and connecting rods 68, by means of which a plurality of valve levers are connected in tandem relation to the same valve. The arrangement and mode of operation of this duplex or multiple connection with the valves will be understood from the several illustrations of different positions shown in Figs. 7 to 10, inclusive, in which the stop represented by the valve 60 is in its "on" position as to one of the keyboards, and "off" as to the other keyboard, the stop represented by the valve 70 is "on" as to both keyboards, while the stop represented by the valve 80 is shown in Figs. 9 and 10 to be in its "off" position, as to both of the keyboards with which it is assumed to be connected by the traces 69 and 79. In Fig. 7 both of these traces are shown in their resting positions. In Fig. 9 the trace 69 is shown as being moved to its farthest position, opening only the valve 70 because of the "off" position of the fulcrum rods 61 and 81, of the valves 60 and 80 respectively. In this view the trace 79 is shown to be in its position of rest between operations. In Fig. 10 the trace 69 is shown to be in its position of rest between operations, but the trace 79 has been operated, thus opening the valves 60 and 70, because of the "on" position of the fulcrum rods 65 and 75, respectively, the valve levers 62, 72, 82 and 86 in that view swinging idly upon their respective pivotal connections.

Figure 11:
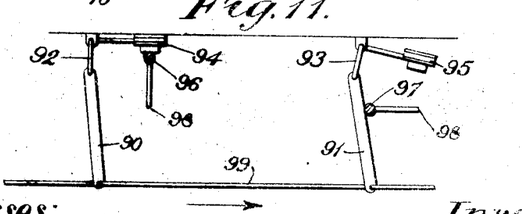
Fig. 11 is an end view showing a modification of the invention.
Figure 12:
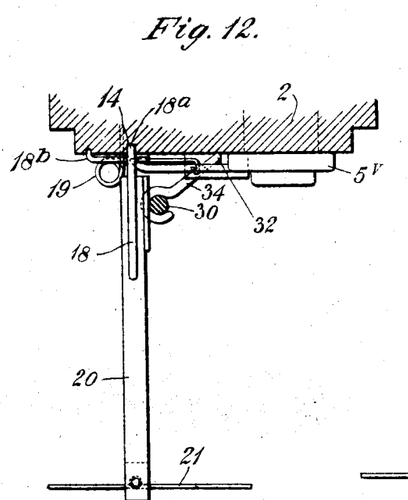
Figs. 12 and 13 are side elevations partly in section of one of the actions, showing the key operated mechanism in two different positions, Fig. 12 showing the valve in its closed position, and Fig. 13 showing the valve in its open position.
Figure 13:
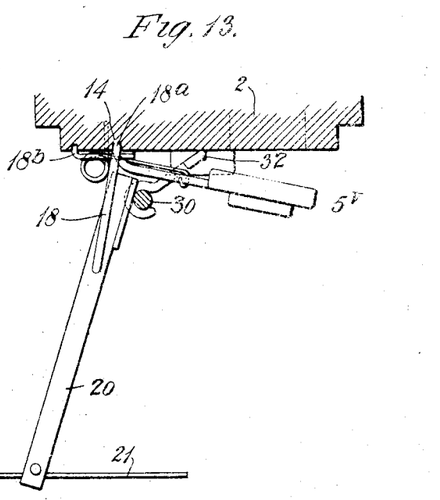
Figure 14:
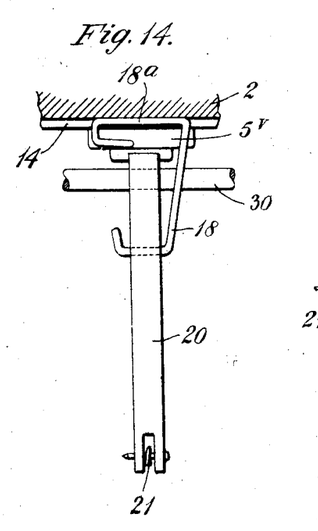
Fig. 14 is an end elevation projected from the left hand side of Fig. 12.
Figure 15:
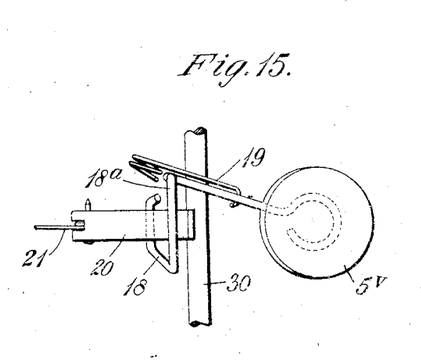
Fig. 15 is a plan view projected from Fig. 13, with the bar omitted.

A further modification is illustrated in Fig. 11, in which the valve levers operate as levers of the first kind, instead of levers of the second kind, illustrated in the previous figures. In this case the valve levers 90 and 91 are suspended by their upper ends upon the arms 92 and 93 of the valves 94 and 95, respectively. The fulcrum rods 96, 97 are pivoted at 98 on suitable brackets, so as to swing from one to the other of the two positions illustrated. These fulcrum rods may be connected by means of traces 99 to stop operating devices like those shown in the previous figures, so that when a stop is drawn on, its fulcrum rod is swung to the position occupied by the rod 97, wherein it forms a fulcrum for the lever 91, while the fulcrum rods of the stops which are not drawn on, rest in the position of the rods 96, locking down their respective valves. In this condition, when the trace 99 is moved by the key action in the direction of the adjacent arrow, the valve levers of all stops which are drawn on act against their respective fulcrum rods and open their respective valves as illustrated by the valve lever 91 acting against the fulcrum 97 to open the valve 95 while the other valve levers attached to the trace 99 of the stops which are not drawn on, swing idly as shown by the lever 90, without opening their associated valves.

Obviously the various parts may be otherwise and further modified as to construction, mode of operation, position and direction of movement in many ways that will suggest themselves to the designer or constructor, according to the number and arrangement of stops, and the space at their disposal.

The controlling means for the key pneumatics 15, 16 and 17 may be of any well-known form, either pneumatic, or electric, or electro-pneumatic, or partly or wholly mechanical. They may be actuated from the keys of a keyboard, or from a tracker board by a perforated music sheet, or those lever arms themselves may be directly and mechanically connected with the keys of the keyboard by suitably extending the traces 21, 22 and 23. In like manner the stop actions may be controlled from the ordinary stop knobs or tablets of the organ console, either by pneumatic, or electric, or mechanical connections, or combinations of these, in various ways which are well-known in this art. But for definiteness and conciseness of phraseology, those portions of the mechanism which when employed in the ordinary manual organ would be operated from the keys of the keyboard for sounding the different notes of the scale in the different stops or registers are herein termed "key" actions or connections, as the case may be; while those portions of the mechanism which when employed in the ordinary manual organ would be operated by the stop knobs or tablets controlling the different stops or registers of pipes, are herein termed the "stop" actions or connections, as the case may be. For definiteness and conciseness of statement, the term "valve" is herein employed to designate the general valve structure, including the pallet which serves to open and close the pipe ducts.

I claim as my invention:—

1. A valve for organ actions, a lever mounted for swinging movement relative to the valve, a combined fulcrum and locking abutment movable from a fulcrum-relation to the lever, into a locking position relative to the valve, whereby the said fulcrum abutment serves in one position as a fulcrum for the lever to move the valve, and in the other position serves as a lock for the valve.

2. A valve for organ actions, a lever mounted for swinging movement relative to the valve, a fulcrum abutment, and radius links sustaining the fulcrum abutment for swinging movement into and out of fulcrum relation to the lever.

3. A valve for organ actions, a valve lever mounted for swinging movement upon and with the valve, a fulcrum abutment, radius links disposed along the fulcrum abutment and supported to swing on a common center of oscillation, suspending the said abutment for swinging movement into and out of fulcrum relation to the valve levers.

4. A valve for organ actions, a valve lever mounted for swinging movement upon and with the valve, a combined fulcrum and locking abutment, and pivotally suspended radius links for sustaining the fulcrum abutment for swinging movement from a fulcrum position relative to the valve lever, to a locking position relative to the valve.

5. A valve for organ actions, a lever mounted for swinging movement upon and with the valve, a fulcrum abutment mounted for swinging movement into and out of a fulcrum relation to the lever, and a spring connected between the abutment and a point beyond the center of the swinging movement, whereby the spring is carried by the abutment across the said center of swinging movement and holds the abutment yieldingly at either end of its swinging movement.

6. A valve for organ actions, a lever mounted for swinging movement upon and with the valve, a fulcrum abutment, radius links for sustaining the abutment for swinging movement into and out of a fulcrum-relation to the lever, and a spring for yieldingly pressing the fulcrum abutment toward each end of its swinging movement, the spring being disposed to swing with the abutment across the center of suspension of the links.

7. A valve for organ actions, a plurality of valve levers disposed in operative relation to the said valve and means for establishing and disestablishing operative connection between any or all of the valve levers and the valve.

8. The combination, with an organ valve, of a plurality of operating levers pivotally connected to the valve and mounted to swing inoperatively on their pivotal connections with the valve, and means for selectively stopping the inoperative movements of any or all of the levers, and converting them into operative movements of the valve.

9. A valve for organ actions, a plurality of operating levers for the valve, and a fulcrum abutment for each of the levers mounted for swinging movement into and out of fulcrum relation to its lever, whereby any or all of the valve levers may be put into or out of operative connection with the same valve.

10. A combined key and stop action for organ pipes, including in combination a valve for one of the pipes, a plurality of operating levers, each pivotally connected with said valve, and a corresponding plurality of independently operated fulcra for the respective levers, each disposed for swinging movement into and out of fulcrum relation to its lever.

11. A combined key and stop action for organ pipes, including in combination a valve for one of the pipes, a plurality of operating levers pivotally connected to the said valve for free swinging movement, a corresponding plurality of movable fulcrum abutments for the respective levers, and means for moving the said fulcrum abutments into and out of fulcrum relation to their respective levers independently of each other, whereby the valve may be operated by any or all of said levers.

12. A combined key and stop action for organ pipes, including in combination a valve for one of the pipes, a plurality of operating levers pivotally connected to the valve in tandem relation to each other, a corresponding plurality of fulcra for the respective levers, and means for independently moving the said fulcra into and out of fulcrum relation to their respective levers.

13. A multiple key and stop action for organs, including in combination a pipe valve, a valve lever pivotally mounted on the valve, a second valve lever pivotally connected with the said valve in tandem relation to the first named lever, a key trace for each of the levers, and means for establishing and disestablishing operating connection between each of the levers and the said valve.

14. A multiple key and stop action for organs, including in combination a pipe valve, a lever pivotally suspended on an arm of the valve for free swinging movement, a second valve lever disposed in tandem relation to the first named lever, a connecting rod connecting the second lever with the said valve arm, key connections for swinging the respective levers, separate fulcrum abutments for the respective levers, and means for moving the said fulcrum abutments independently of each other into and out of fulcrum relation to their respective levers, whereby the said pipe valve may be operated by either or both levers.

15. Multiple key and stop actions for organs, including in combination a plurality of stops, a valve for each pipe in the said stops, a plurality of key traces and valve levers for each valve, and a corresponding plurality of independently operated fulcra for each stop, each of said fulcra being mounted for swinging movement into and out of fulcrum relation to its valve lever.

16. A duplex key and stop action for organs, including in combination a plurality of stops, a valve for each pipe in the said stops, two independent sets of key traces and valve levers for the respective valves, and two different fulcrum abutments for each of said stops, each abutment being common to all the valve levers of one of the said sets, and means for moving the said abutments independently into and out of their fulcrum position, whereby any valve in any of said stops may be operated by either of its two key traces.

In testimony whereof I have signed my name to this specification in the presence of two subscribing witnesses, this 27th day of July, 1911.

JOHN T. AUSTIN.

Witnesses:
KARL E. PEILER,
CAROLINE M. BRECKLE.